United States Patent [19]

Salomon

[11] 4,368,858

[45] Jan. 18, 1983

[54] PORTABLE DRUM REEL

[76] Inventor: Gustav Salomon, 135 Hanassi St., Haifa, Israel

[21] Appl. No.: 175,822

[22] Filed: Aug. 5, 1980

[51] Int. Cl.³ .................... B65H 17/46; B65H 49/00
[52] U.S. Cl. .................................... 242/129.5; 242/85
[58] Field of Search ............ 242/54 R, 85, 125–125.2, 242/77.3, 129.5–129.62, 139, 99; 191/12.2 R, 12.2 A, 12.4

[56] References Cited

U.S. PATENT DOCUMENTS

| 2,717,129 | 9/1955 | McDonald | 242/99 |
| 3,346,705 | 10/1967 | Slinkard et al. | 242/107 |
| 3,536,275 | 10/1970 | Salomon | 242/85 |
| 3,927,687 | 12/1975 | Thierman | 242/125 |
| 3,983,977 | 10/1976 | Crabb | 191/12.4 |
| 4,114,826 | 9/1978 | Diebolder | 242/85 |

Primary Examiner—Leonard D. Christian
Attorney, Agent, or Firm—Fleit & Jacobson

[57] ABSTRACT

A portable drum reel consisting of a drum portion onto which an electrical cable or a hose can be wound. The drum portion is flanked by two circular flanges. An aperture leads into the interior of the drum; a slit extends radially from the edge of one flange and merges with the aperture.

3 Claims, 3 Drawing Figures

U.S. Patent  Jan. 18, 1983  4,368,858
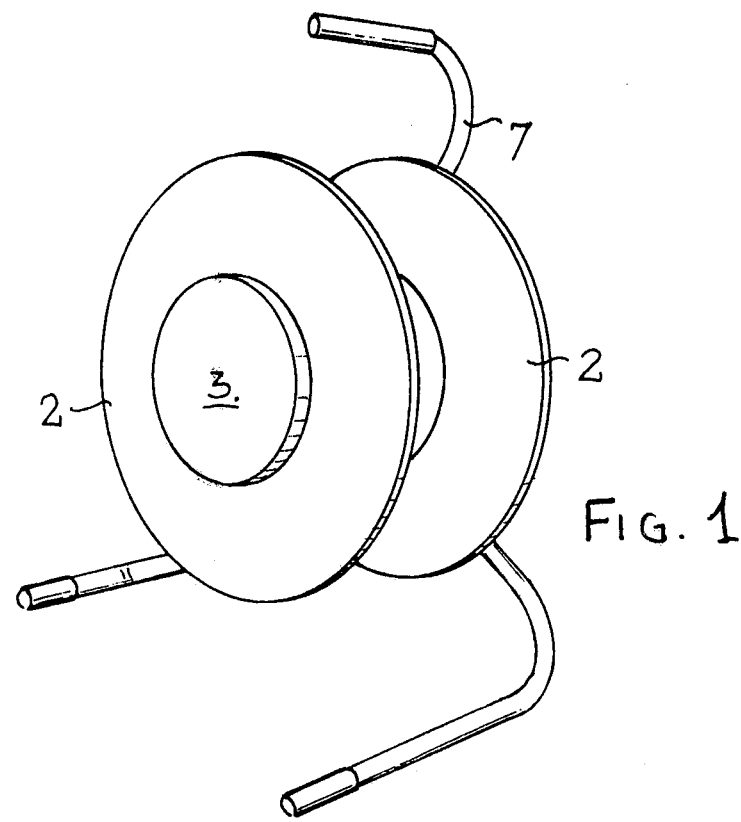
FIG. 1
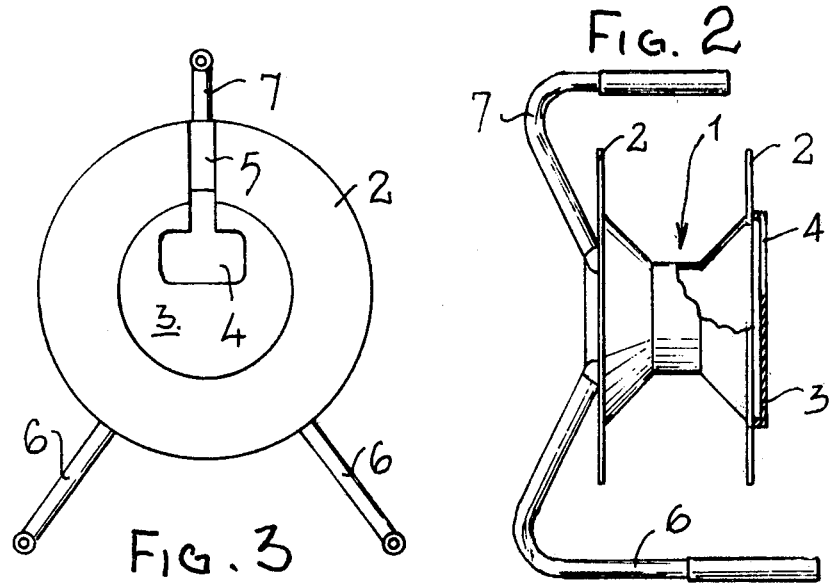
FIG. 2
FIG. 3

PORTABLE DRUM REEL

BACKGROUND OF THE INVENTION

In my earlier U.S. Pat. No. 3,536,275 patented Oct. 27, 1970 I have described a portable drum reel intended for use—inter alia—with electrical cables. The reel, according to that patent includes a drum on one side of which are provided several electrical sockets. Such a drum with the cable wound thereon—one end of which has affixed to it a plug—can thus be used as an extension cord for connecting remotely located electrical appliances to the grid; the said plug is inserted into an available wall socket, and the drum, with the cable unwinding, is carried to the place of the respective appliances which can be connected by plugging the respective plug of such an appliance into one of the sockets on the drum.

FIELD OF INVENTION

There are in use long extension cords at one end of which is provided the plug, while the opposite end of the cord carries a so called receptacle on which—or in which—are provided a number of sockets.

The present invention provides a portable drum reel for use with extension cords having both a plug and a receptacle with sockets. The drum reel according to this invention is a variant of the device according to my above mentiond earlier patent.

SUMMARY OF THE INVENTION

According to the invention there is provided a drum reel generally of a build according to my earlier patent No. 3,536,275 wherein the drum portion on which an electrical cable, a hose or a like article is to be wound has two circular flanges on opposite sides of the drum and flanking the latter. The drum proper is hollow and an aperture is provided in one of its circular faces leading into the interior of the drum, a radial slit being provided in one of the said circular flanges extending from the periphery of the flange and debouching into the said aperture.

Thus, cable reeled onto the drum and partly unwound may be passed through the said slit, to be connected to a wall plug or to an appliance, as might be required.

The receptacle may be stored, when the cable is not in use, in the interior of the drum, being inserted thereinto through the said aperture.

SHORT DESCRIPTION OF DRAWINGS

FIG. 1 is a perspective view of the known portable drum.

FIG. 2 a side elevation, partly in section of the drum according to this invention.

FIG. 3 is a frontal view thereof.

DESCRIPTION OF PREFERRED EMBODIMENT

The drum reel comprises the drum proper, generally indicated by the numeral 1 which is flanked by two circular flanges 2. The drum is hollow and closed to the outside by a cover plate 3. In plate 3 is provided an aperture 4 giving access to the interior of the drum. Through that aperture an elongated receptacle with three or four sockets in a row can be placed (when not in use) into the interior of the drum. As illustrated in FIG. 3, an elongate member C, such as a cable wound on the drum, when being unwound partly—with part of it still on the reel has an end portion with a fixture or plug P for connection with a wall socket. Another end portion of the cable carries a fixture or receptacle R that is accessible because the end portion has been passed through a slit 5 cut radially in flange 2.

The drum reel is provided with legs 6 and handle 7 as described in detail in my earlier patent.

I claim:

1. A portable drum reel for transporting an elongate member having end portions carrying fixtures, said drum reel comprising:

a drum portion for supporting the elongate member in a condition wound thereabout, said drum portion having an end defining an aperture for receiving a fixture carried by one of the end portions when not in use; and first and second oppositely disposed flanges flanking the drum portion, the first of the flanges having a slit formed therein extending inwardly from an outer peripheral edge of the flange and merging with said aperture, said slit receiving therethrough said one of the end portions of said elongate member so that the fixture carried by said one end portion is positionable exterior of the drum portion prior to winding of the elongate member about the drum portion, the fixture carried by said one end portion being accessible at all times, the fixture carried by the other of said end portions being accessible by unwinding said other end portion from said drum portion.

2. A portable drum reel according to claim 1, wherein said drum portion is hollow and has a cover plate closing an end thereof adjacent said first flange, said cover plate having said aperture formed therein for receiving the fixture carried by said one end portion when not in use.

3. A drum reel according to claim 1, or 2, wherein said elongate member is a cable, one of said fixtures is a receptacle, and one of said fixtures is a plug, the end portion carrying said receptacle being passed through the slit prior to winding of the cable about the drum portion so that the receptacle is accessible after the cable has been wound about the drum portion.

* * * * *